United States Patent
Dworak et al.

[11] Patent Number: 5,094,657
[45] Date of Patent: Mar. 10, 1992

[54] METHOD AND APPARATUS FOR CONTINUOUSLY FORMING AND SEALING LOW DENSITY POLYETHYLENE BAGS AT HIGH SPEED

[75] Inventors: Adam J. Dworak, Chicago; Charles E. Cloud, Northbrook, both of Ill.

[73] Assignee: Cloud Corporation, Des Plaines, Ill.

[21] Appl. No.: 620,138

[22] Filed: Nov. 29, 1990

[51] Int. Cl.⁵ .................. B65B 51/14; B65B 51/16; B65B 51/26; B31B 1/64

[52] U.S. Cl. .................. 493/208; 493/209; 493/230; 53/374.4; 53/374.6; 156/323

[58] Field of Search .......... 493/208, 209, 230, 241, 493/242; 53/479, 373.7, 373.8, 374.4, 374.6; 156/323, 253, 252, 513, 582

[56] References Cited

U.S. PATENT DOCUMENTS

| | | |
|---|---|---|
| 2,743,762 | 5/1956 | Reitzes . |
| 3,748,207 | 7/1973 | Campbell et al. ............ 53/374.4 X |
| 3,940,305 | 2/1976 | Stenberg . |
| 3,965,333 | 6/1976 | Elsner et al. . |
| 3,992,981 | 11/1976 | Stock . |
| 4,016,021 | 4/1977 | La Fleur . |
| 4,249,364 | 2/1981 | Kawasaki et al. ............ 53/374.4 X |
| 4,305,240 | 12/1981 | Grevich et al. ............... 53/374.6 |
| 4,313,781 | 2/1982 | Rovigo . |
| 4,317,697 | 3/1982 | McLean . |
| 4,380,446 | 4/1983 | Dickson et al. ............... 493/208 X |
| 4,449,962 | 5/1984 | Copia . |
| 4,553,377 | 11/1985 | Klinkel . |
| 4,758,293 | 7/1988 | Samida ........................... 493/208 X |
| 4,854,983 | 8/1989 | Bryniarski et al. ............ 493/208 X |
| 4,867,735 | 9/1989 | Wogelius ....................... 493/208 X |
| 4,909,016 | 3/1990 | Rentmeester et al. ........ 156/582 X |

Primary Examiner—Horace M. Culver
Attorney, Agent, or Firm—Charles F. Meroni, Jr.

[57] ABSTRACT

A high speed method of manufacture of filled polyethylene pouches from polyethylene film comprising the steps of folding the film and causing it to move in folded flat form transversely sealing the film at longitudinally spaced intervals forming a continuous length of open edged unfilled polyethylene pouches, perforating the strip or web forming transversely extending longitudinally spaced lines of perforations between the pouches, exerting a vacuum upon the strip or web holding down sides of the unfilled pouches to stabilize the held sides thereof, blowing air at the open edged unfilled polyethylene pouches separating unheld sides of the pouches away from the vacuum held sides of the pouches, thus consecutively opening the pouches preparatory for filling the pouches, filling the pouches by moving articles to be packaged into the opened unfilled ends of the pouches, sealing the open ends of the filled pouches, and severing the pouches from the continuous strip for cartoning.

20 Claims, 15 Drawing Sheets

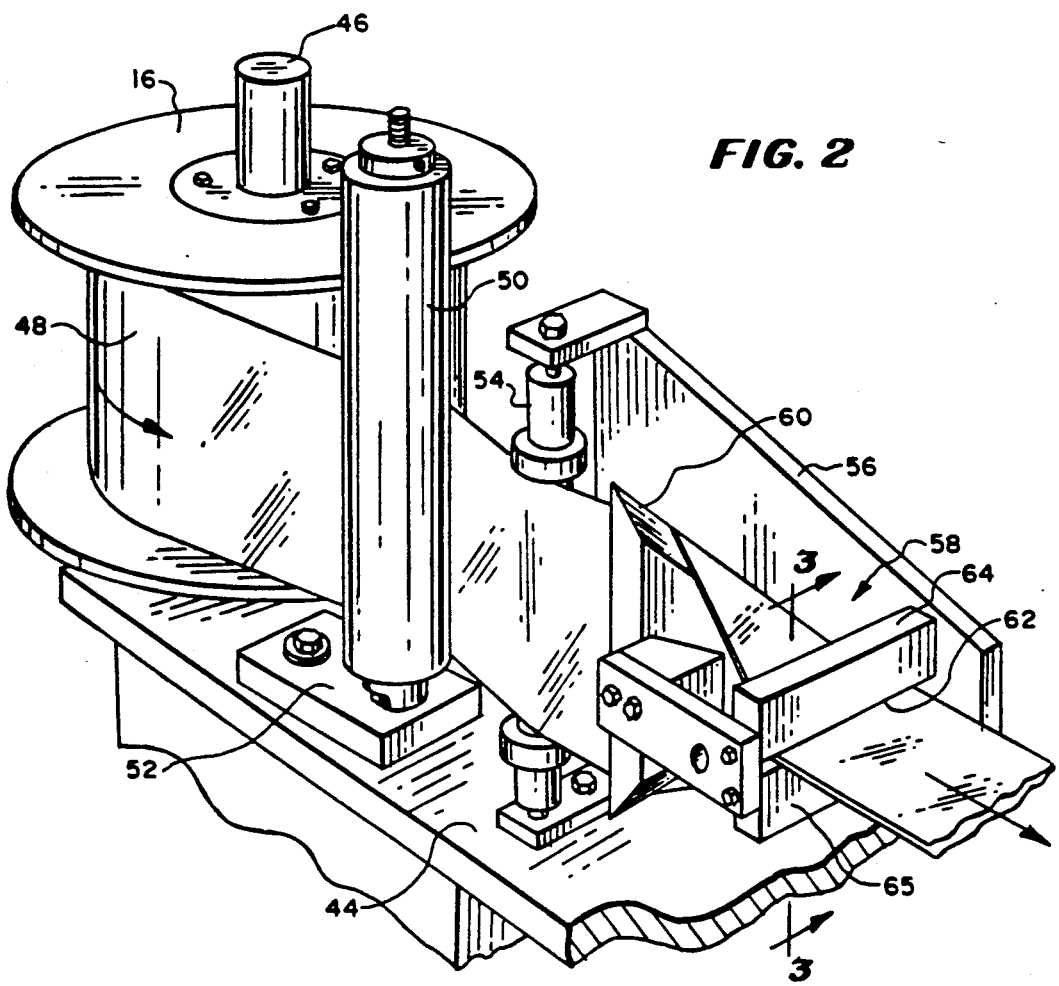
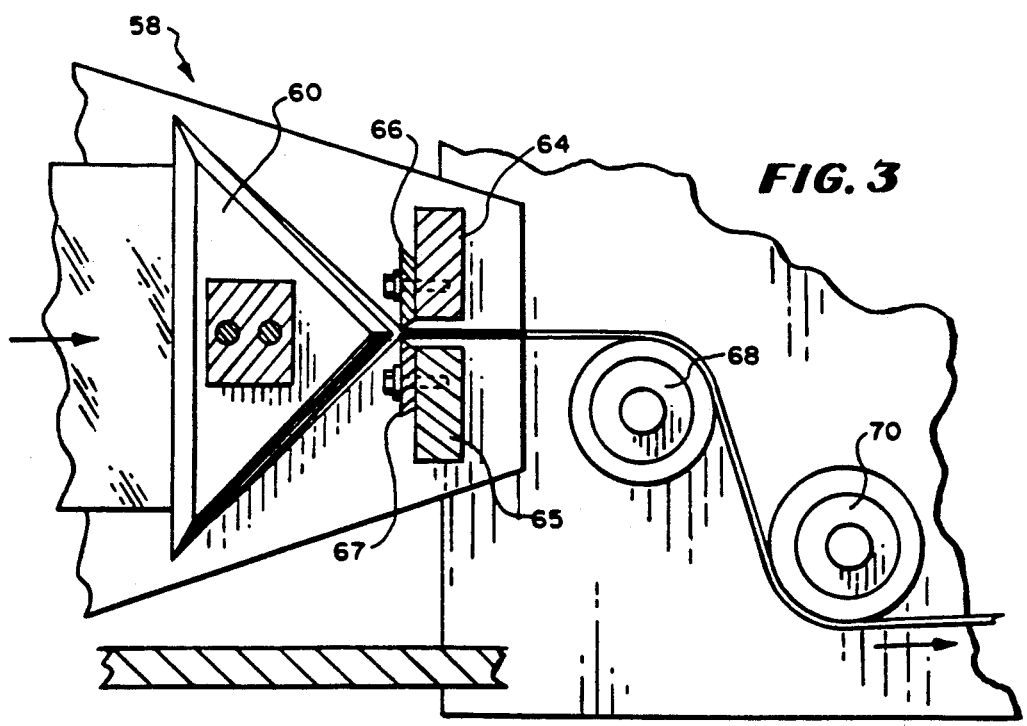

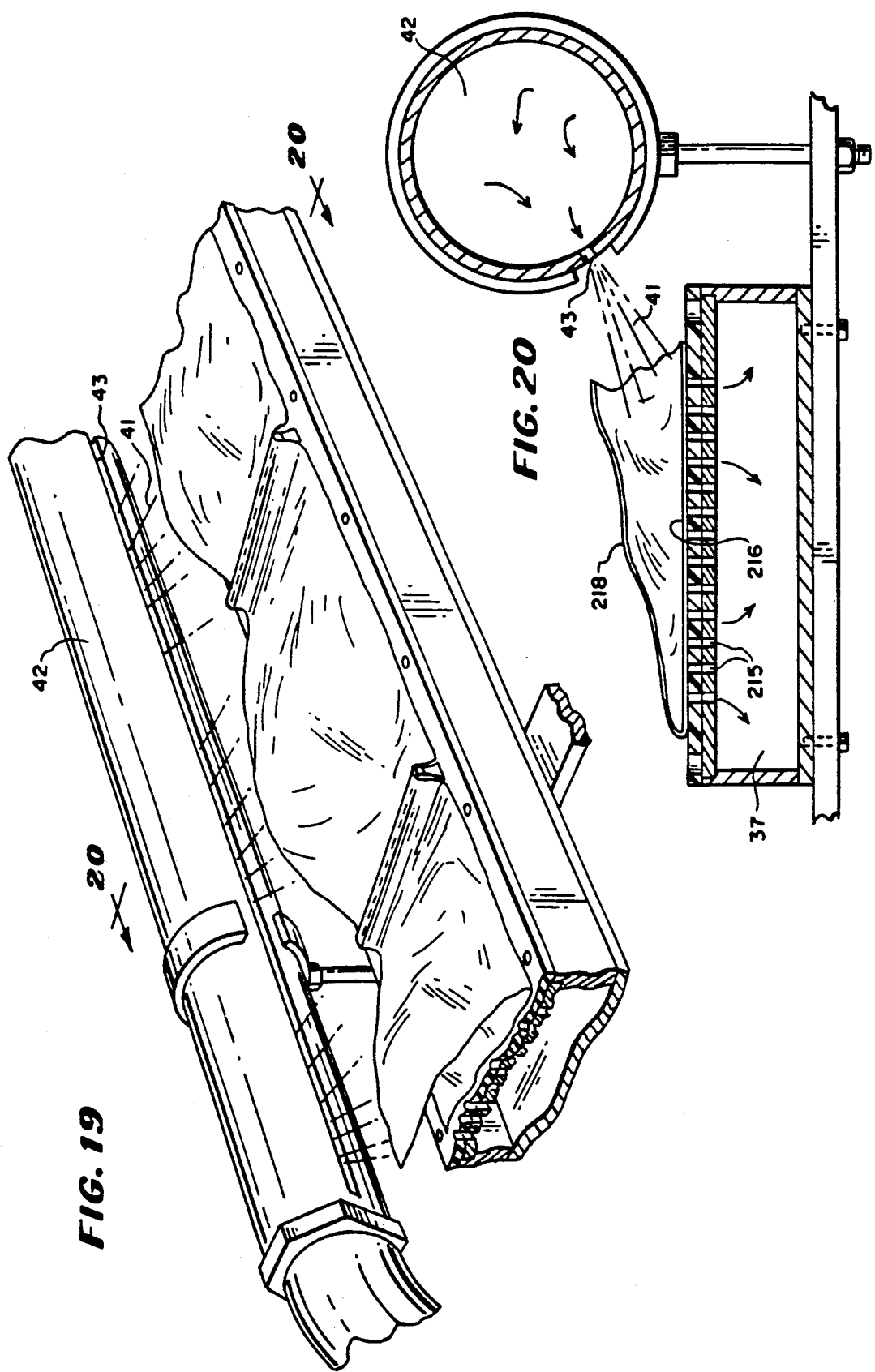

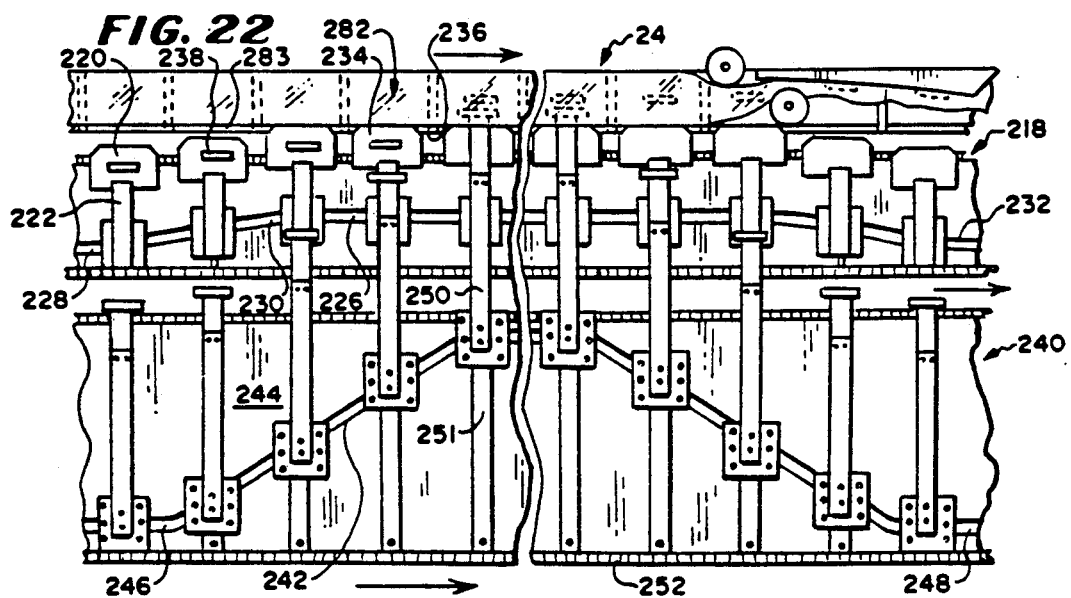
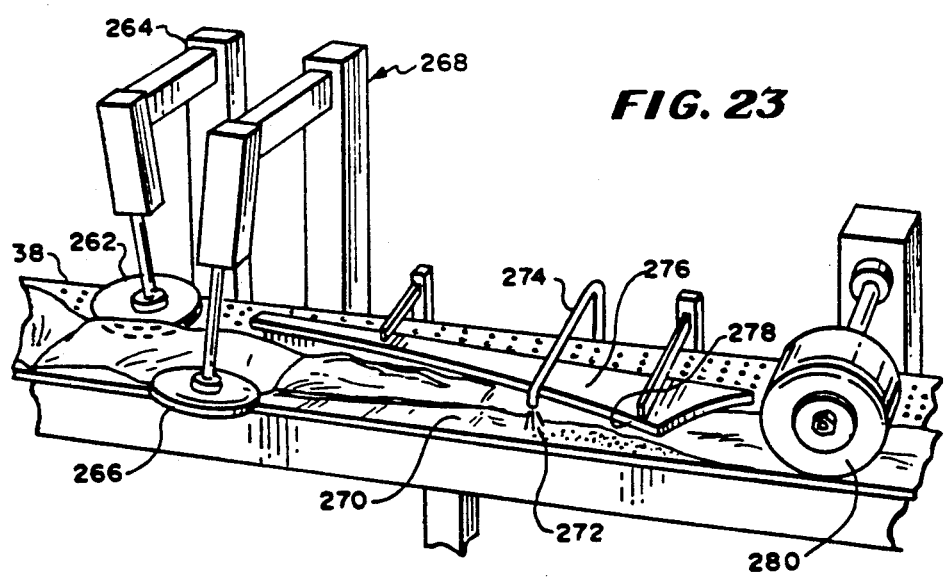

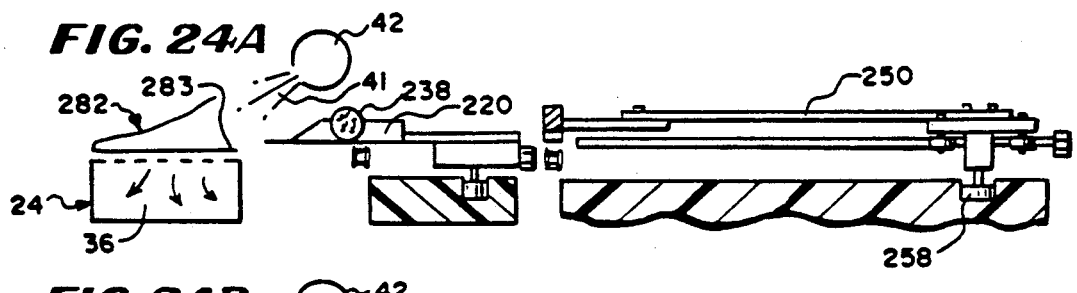
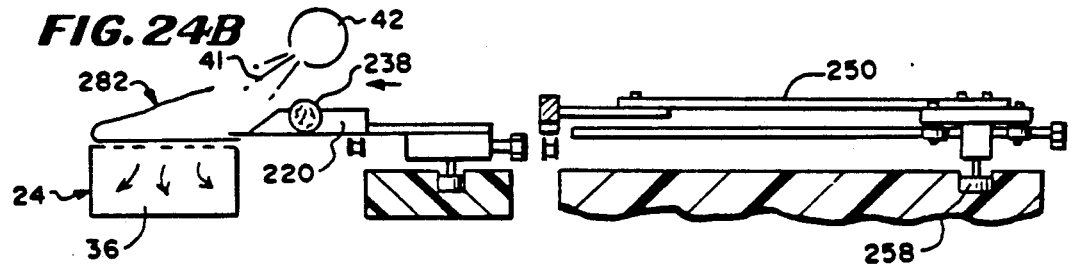
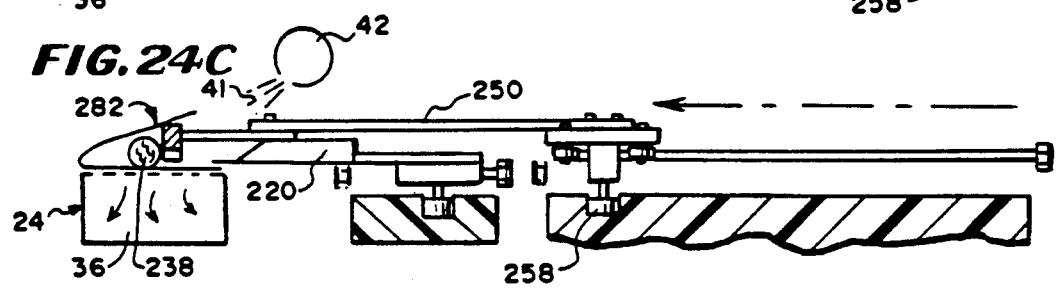
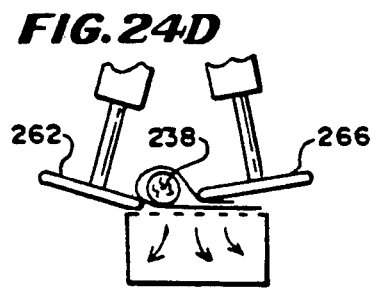
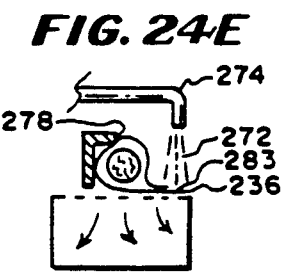
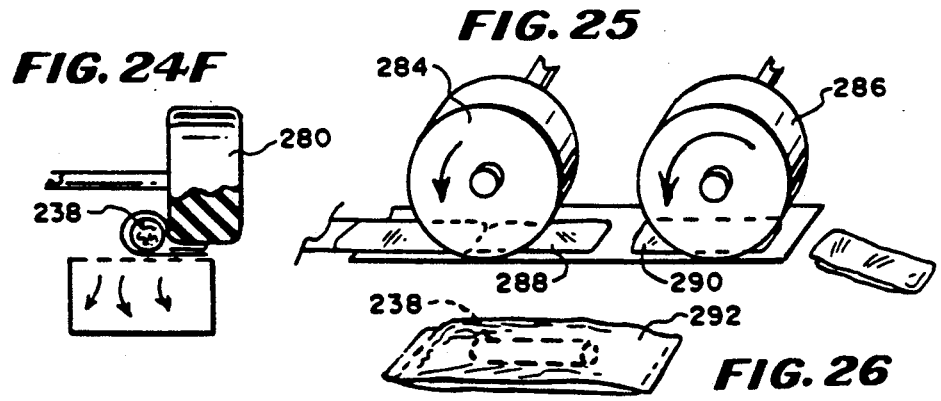

5,094,657

METHOD AND APPARATUS FOR CONTINUOUSLY FORMING AND SEALING LOW DENSITY POLYETHYLENE BAGS AT HIGH SPEED

FIELD OF THE INVENTION

The present invention concerns a new and improved method and apparatus for continuously forming sealed, filled low density polyethylene bags at high speeds. The film used is preferably an unsupported or paper free low density type of heat fusible synthetic film such as polyethylene.

According to our invention, a drum is utilized for receiving a continuous web of folded film which most desirably is of a low cost polyethylene type. In the past, we have not known of any way to form heat seals in certain types of low cost low density polyethylene film where a continuous web is to remain intact during forming, filling and closing operations whereupon sealed filled pouches can be consecutively severed from a forward most end of the web in a continuous high speed operation. It has been found that 1.5 mil low density polyethylene film works very satisfactory and it is believed that the thickness range is between 0.5 mil and 4 mil.

According to our invention we have developed a new and improved sealer for sealing polyethylene at high speeds. The drum has a series of circumferentially spaced axially extending sealing bars which are radially movable into and out of contact with the continuous web of polyethylene while being maintained at a temperature of about 400° F. Mounted on the drum at circumferentially spaced intervals adjacent to each of the heated bars is a sheet of stainless steel which is about two thousandths of an inch thick. This stainless steel sheet is covered with teflon material that is adhered to a radially outer surface of the stainless steel sheet. A low density unsupported or paper free type of polyethylene film is laid on the drum over drum slots with the stainless steel sheets being in radial alignment with the drum slots. A rubber pad is supported on a chain which is pressed against the polyethylene web which web is held against the stainless steel sheet. To make a seal, the heated knife is pushed radially outwardly against the stainless steel for about three tenths of a second, which heats the stainless steel and the polyethylene very quickly to about 250° F. After the fraction of a second expires, the bar is withdrawn. When the bar is withdrawn the stainless steel and polyethylene immediately begin to cool to about 200° F. about the serrations on the knife so that perforations are formed about the serrations during the cooling period. Once the film is cooled, the film is removed from the stainless steel to provide a perforated heat seal. In order to seal polyethylene, it must actually be melted or fused by elevating the polyethylene almost to its melting point such as at 250° F. to obtain a seal, while the film is clamped between the stainless steel and the rubber pad.

It will thus be understood that while the film is clamped against the "Teflon" coated film shield over the associated slot in the drum, and when the film is then heated it is caused to melt to permit the perforations to be formed around the serrations on the blade while the film is in a relatively liquid state so that the film is not really cut by the serrated blade but rather the serrations sink into the soft melted film to form the perforations.

As an added feature a serrated knife blade is secured on the chain and is pressed radially inwardly against the almost liquified heated polyethylene web and then the film is allowed to cook to form perforations about the serrations. The blade is located at the center of the rubber pad, and is pressed against polyethylene while it is being sealed or heated. The knife blade indents or perforates the polyethylene and creates a weakened section in the polyethylene so that it may be broken at the weakened section when it is pulled at a later time when the filled pouch is to be detached from the web. During a cut-off operation after the formed pouches are filled and sealed, the end most or most forward polyethylene pouch is pulled causing it to break at the weakened section of the film by severing the line of perforations created by the knife blade.

One important advantage of our new method of an apparatus for sealing is that we can obtain what would look like an impulse seal which is a good consistent seal, and the sealing can be done on a drum at a high speed. The actual time for sealing is somewhere in the range of three tenths of a second for heating, and three tenths of a second for cooling, so that a complete seal be made in six tenths of a second, which is much faster than previously known techniques for making impulse seals. We have found that this heating cycle works satisfactorily on 1½ mil unsupported-type polyethylene film at certain speeds of production. If the production speeds were very slow then sealing times would be varied. Our method and apparatus has now been adapted to a drum which allows seals to be made on polyethylene film at high speeds. We have found that with package length of 6¼" to be made, a drum 30" in diameter could seal in excess of 400 packages a minute, which would be very fast for polyethylene material. If the packages are shorter in length, then the number of packages per minute can be increased.

DISCUSSION OF PRIOR ART

The prior art consists of either what is called a "hot wire cut-off" that is essentially a hot knife blade that is pressed against two (2) layers of polyethylene to fuse them together, and while the fusing takes place, the hot knife blade also melts the film completely to provide a cut-off. Therefore, the main cut-off seal is used in the industry so that a hot wire or a hot knife provides a cut off seal. This seal is a melted seal that can be very good, but all temperatures, pressures and tensions must be adjusted very carefully to give a consistent good seal. The technique of making seals in this manner using polyethylene films is a rather slow production procedure as compared to our invention as herein disclosed.

Another method that has been used for years is what is called an impulse seal, which involves the use of a nichrome ribbon that is approximately a 1/16" wide and this ribbon is mounted on top of an insulating pad. Usually this nichrome ribbon is covered with a sheet of teflon fiber glass cloth. The two layers of polyethylene are laid on top of the fiber glass cloth and a rubber pad is pressed against the polyethylene. The nichrome wire is then energized or electric current is passed through the wire for a fraction of a second, and this heats the wire to 300° or 400°. The wire and the polyethylene are allowed to cool, and then the pressure pad is removed from the polyethylene and the film removed from the sealer, and what you end up is what is called an "impulse seal" of polyethylene which is actually a melting of the polyethylene.

SUMMARY OF THE INVENTION

In accordance with our invention we have developed a high speed method of manufacture of filled polyethylene pouches from low density polyethylene film. Our method comprises the steps of folding the film and causing it to move in folded flat form away from the continuous roll as a continuous V-shaped film strip, transversely sealing and perforating the strip at longitudinally spaced intervals forming a continuous strip of open edged unfilled polyethylene pouches all of which are laid on their sides and with the perforations extending in lines transversely of the strip between the seals, exerting a vacuum consecutively upon bottom side of the unfilled pouches to hold down and stabilize the bottom side thereof preparatory to filling the pouches, blowing air at the open edged unfilled polyethylene pouches lifting upper unheld sides of the pouches away from the vacuum held sides of the pouches, thus consecutively opening the pouches preparatory for filling the pouches, filling the pouches while holding down one side of the pouch and using fingers to push articles to be packaged into the side opening unfilled pouches, sealing the side openings of the filled pouches, and severing the pouches from the continuous strip for cartoning by breaking each of the lines of perforations between the pouches to sever the pouches consecutively from the strip.

The invention further concerns an apparatus for high speed manufacture of filled polyethylene pouches from a continuous roll of low density polyethylene film, the improvement comprising a drum, means for feeding a continuous web of polyethylene film onto said drum, a plow for folding the web before the web is fed onto said drum causing the web to be folded to provide a continuous V-shaped film strip, circumferentially spaced heat sealing mechanisms mounted interiorly of said drum for forming longitudinally spaced heat seals extending transversely across the polyethylene web of film, means mounted externally of said drum on said apparatus radially outwardly of each of said heat sealing mechanisms for contemporaneously forming a line of perforations across the web bisecting the heat seals to form a succession of pouches along the length of the web, means for exerting a vacuum consecutively upon bottom sides of the unfilled pouches to stabilize the bottom sides thereof, blowing air against unsealed edges of the pouches for lifting upper unheld sides of the pouch away from the vacuum held sides of the pouch, thus consecutively opening the pouches preparatory for filling the pouches, means for filling the opened unfilled pouches, means for sealing open ends of the pouches, and cut-off means for consecutively severing the pouches from the continuous strip at the lines of perforations for cartoning the thus formed filled and sealed pouches.

Further features of our invention concern a rotary drum sealing apparatus for sealing low density polyethylene film for packaging articles comprising a hollow rotary drum for sealing film at its outer perimeter, film heating mechanisms reciprocally mounted interiorly of the drum, circumferentially spaced drum slots extended through the perimeter of the drum for receiving outer ends of the film heating mechanisms, "Teflon" coated stainless steel slot shields closing the drum slots for shielding the film from the outer ends of the film heating mechanism to prevent direct contact of the film with the heating mechanisms and with the film heating mechanisms in periodic contact with the shields for heating the shields and sealing the film, means securing the slot shields to the drum enabling the film to be maintained at all times free of contact from the film heating mechanisms, and timed means for retracting the film heating mechanisms after package seals have been sequentially formed in the film. Yet further features of our invention concern the use of an endless rotary chain is mounted tangentially of the drum for periodic cooperative coaction therewith during formation of heat seals in the film, the chain having knife block assemblies carried along the length thereof each with a knife, the knife block assemblies being positioned for periodic operative engagement with outer surfaces of the slot shields over the drum slots, and means timed for actuating the knives to cut the film while film seals are being formed by the film heating mechanisms.

According to other important features of our invention, we have provided a rotary drum sealing apparatus for sealing low density polyethylene film for packaging articles comprising a hollow rotary drum for sealing film at its outer diameter, radially extending film heating mechanisms positioned in the hollow drum radially outwardly of a central axis of the drum, circumferentially spaced drum slots through the drum for receiving outer ends of the film heating mechanisms, high temperature, heat resistant, non-sticky type synthetic plastic coated metallic slot shields closing the drum slots for shielding the film from the outer ends of the film heating mechanism to prevent direct contact of the film with the heating mechanisms, means securing the slot shields to the drum enabling the film to be maintained at all times free of contact from the film heating mechanisms, and means for moving the film heating mechanisms in the hollow drum into contact with the shields for heating the film, and timed means for retracting the film heating, mechanisms after the package seals have been sequentially formed.

Our invention also involves other methods of manufacture and to this end we have provided a method of packaging continuously formed pouches from low density polyethylene layered film which may be in the form of a single strip or in the form of a pair of strips as elected by the manufacturer. The method comprises the steps of training the layered film onto a drum over slots in its outer periphery, consecutively heating "Teflon" coated metallic shields over the slots while the low density polyethylene layered film is engaged with the shield causing the state of the layered film to change to a high temperature liquified state, moving a serrated knife into the liquified film while in the high temperature liquified state with the serrations being immersed in the liquified film, cooling the shields causing the liquified film to solidify and to become fused thereby forming serrated seals which seals are located at spaced intervals along the length of the layered film.

BRIEF DESCRIPTION OF THE DRAWINGS

The various features of the invention will be better understood from the following detailed description when read in connection with the drawings, in which:

FIG. 2 is an enlarged perspective view of a film dispensing drum, a tensioning roller, an aligning shaft and a folding plow;

FIG. 3 is an enlarged side view of the folding plow and film positioning rollers;

FIG. 19 is a fragmentary perspective showing a portion of the conveyor vacuum chamber, pouch retention means, and air delivery system by which the pouches are opened for filling;

FIG. 20 is a sectional view along line 20—20 of FIG. 19 to show the pouch forming action and envelope or pouch wall retention more clearly;

FIG. 22 is a top plan view of the filling apparatus shown in FIG. 21, with a break in its length so that the initial and final actions can be portrayed;

FIG. 23 is an upper perspective view of a terminal end of the pouch-filling conveyor with a foldover wheel, retaining wheel, glue deposition tube, and cushioned sealing roll all shown for sealing the filled pouches in accordance with our invention;

FIGS. 24A-24F are a series of diagramatic views illustrating how the pouches are filled in a step-by-step manner;

FIG. 25 is a diagramatic view showing a pouch separation apparatus for separating the individual filled pouches from a continuous strip of the connected pouches at the performations; and FIG. 26 is a perspective view of a typical pouch after it has been formed, filled, sealed and separated on our apparatus in the practice of our new method of manufacture.

DETAILED DESCRIPTION OF THE DRAWINGS

Figure 1:
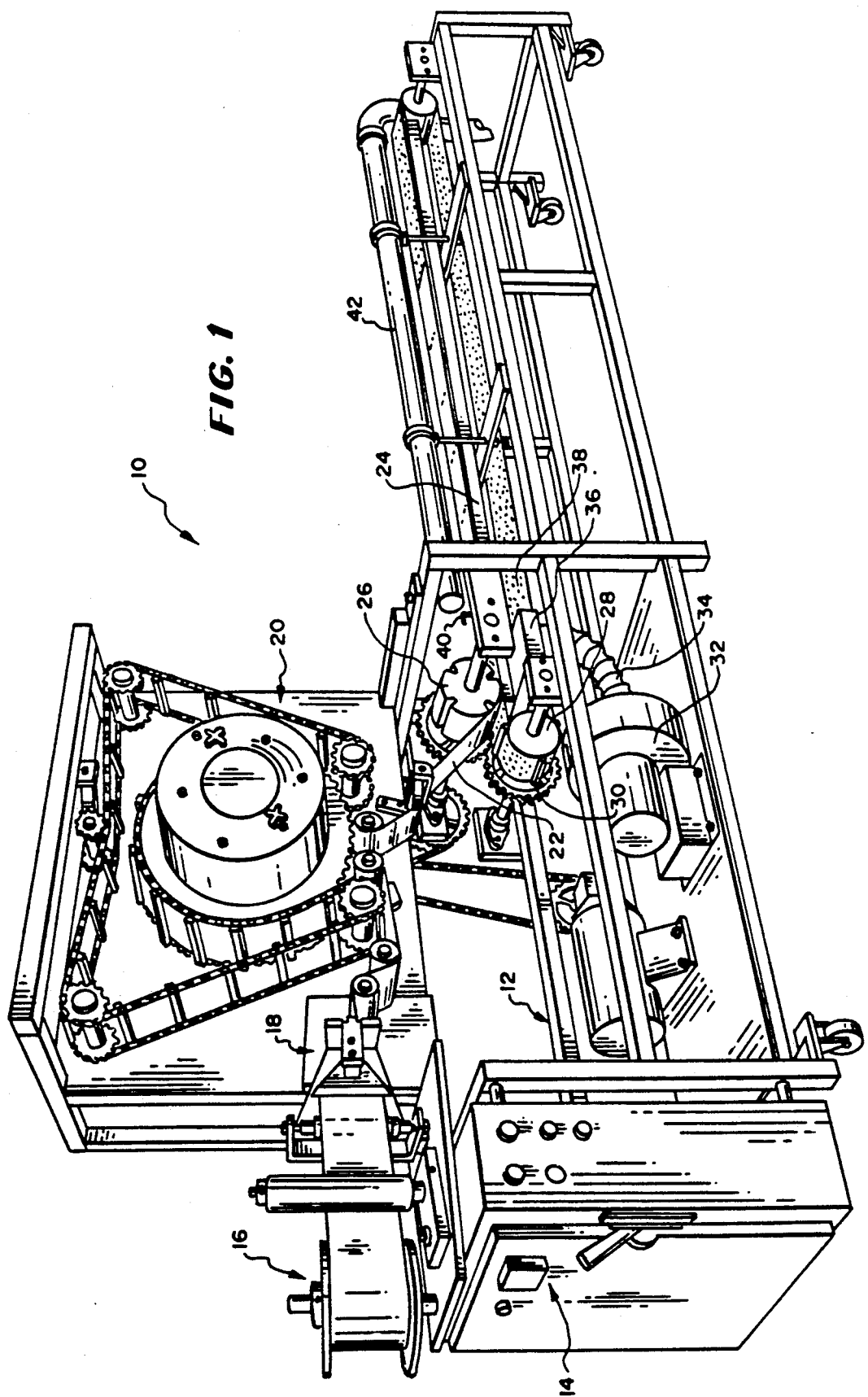
FIG. 1 is a perspective view of a pouch forming apparatus embodying important features of our invention.

In FIG. 1, there is shown a perspective view of an apparatus or packaging machine 10 for converting an unsupported or paper free type of plastic film preferably of a low density polyethylene type into formed pouches for the insertion of a variety of different manufactured products such as tampons as part of a total packaging process. A tubular framework or frame structure 12, including controls housed in conjunction with control panel 14, supports the primary system of components in a relationship which permits a station-by-station process to occur. This process includes the functions of dispensing the film from a continuous film roll 16 into a folding or plowing station 18 from which it is delivered for partitioning into individual formed pouch segments to ultimately become filled sealed pouches. The partitioning action is produced around the drum assembly 20 and involves sealing and perforating at measured intervals to achieve a continuous flow of connected plastic film pouches. These pouches are of several different types and are described in greater detail hereafter in connection with our description of the method of their manufacture. One type is as illustrated at 282 in FIGS. 24 A-F and FIG. 25. This segmented strip of folded plastic film 22 is then rolled onto an endless conveyor belt 38 carried on conveyor 24 via a tucker roller 26 and an indexing belt roller 28. These two rollers 26 and 28 cooperate in such a way that the film envelopes or pouches have their sealed seams and perforated connections coinciding with a series of ribs 30 on the conveyor belt 38. According to certain features of my invention, vacuum is applied by a vacuum motor and pump 32 through a delivery hose 34 to a pleneum 36 (FIG. 17) which is operatively connected to an enclosed vacuum chamber 37 that extends beneath the perforated conveyor belt surface 38. The film is thereby constrained between the conveyor ribs 30 into rib spaces along the length of the conveyor belt 38 while on the conveyor belt. The film or pouches each further has its lower or belt side envelope or pouch panel or pouch side pulled tightly against the belt surface by the force of the vacuum when exerted through the vacuum chamber 36.

An air jet 40 at the exit from the tucker roll 26 provides an initial stream of high-pressure air directed at an, open edge of the film envelope or pouch to lift an upper film panel or pouch which is free to separate from the lower vacuum-constrained panel. Thus individual, opened pouches are formed in the segmented film layers between the separating ribs 30 of the conveyor 38. This condition is maintained by an air manifold 42 which delivers air toward the now opened pouches as they continue along the conveyor. At this point, insertion devices can be utilized to put manufactured objects to be packaged into the open pouches of different types. According to other features of my invention, a device or means for filling the unfilled open sided pouches is illustrated in FIGS. 21 through 24F.

While our invention has been specifically illustrated in connection with the formation of pouches from a single web of material, it will be appreciated that it is within the scope of our invention for the pouches to be formed from a pair of webs rather than a single web. If a pair of webs is used, then an additional seal must be formed between the webs at the bottom to close the side of the web where the pouch bottoms are to be located. Machines having sealers for accomplishing the sealing of the bottoms of pouches formed from a pair of webs are well known in the art and in the previously issued U.S. patents to Charles E. Cloud. Still further, it will be appreciated if that our machine could also be modified in such a way as to rotate the sealed web or webs 90° so that the pouches formed could be filled by dropping articles into the open sides or ends of the pouches rather than as herein disclosed without departing from the scope of our invention.

In FIG. 2, upon a machine surface 44 of the frame, the dispensing film roll 16 is installed on shaft 46 carrying a single thickness plastic film 48 which is drawn from the dispenser by the driven drum 20 shown in FIG. 1. A tension sensing roller 50, laterally movable on mounting lever 52, maintains proper film tension between the dispenser and immediately following operating stations of our apparatus or machine. A vertically adjustable alignment shaft 54, mounted on the machine surface 44 and supported by vertical rear plate 56, positions the film for entry to a folding plow 58. The plow consists of a V-shaped blade 60 over which the film is drawn into a horizontal folded configuration from its vertical plane. Approximately one half of the film width is pulled over the upper leg of the V-shape while the other half of the film is drawn past the lower leg of the V-shape. This action occurs due to the film being drawn through a singular slot 62, located between a pair of vertically spaced metal blocks 64 and 65 (FIG. 3) to which replaceable blades 66 and 67 (FIG. 3) are attached. These blades are replaceable since they become worn over time with the passage of the folded film. Rollers 68 and 70 position the folded film at a level for entering onto the drum.

Figure 4:
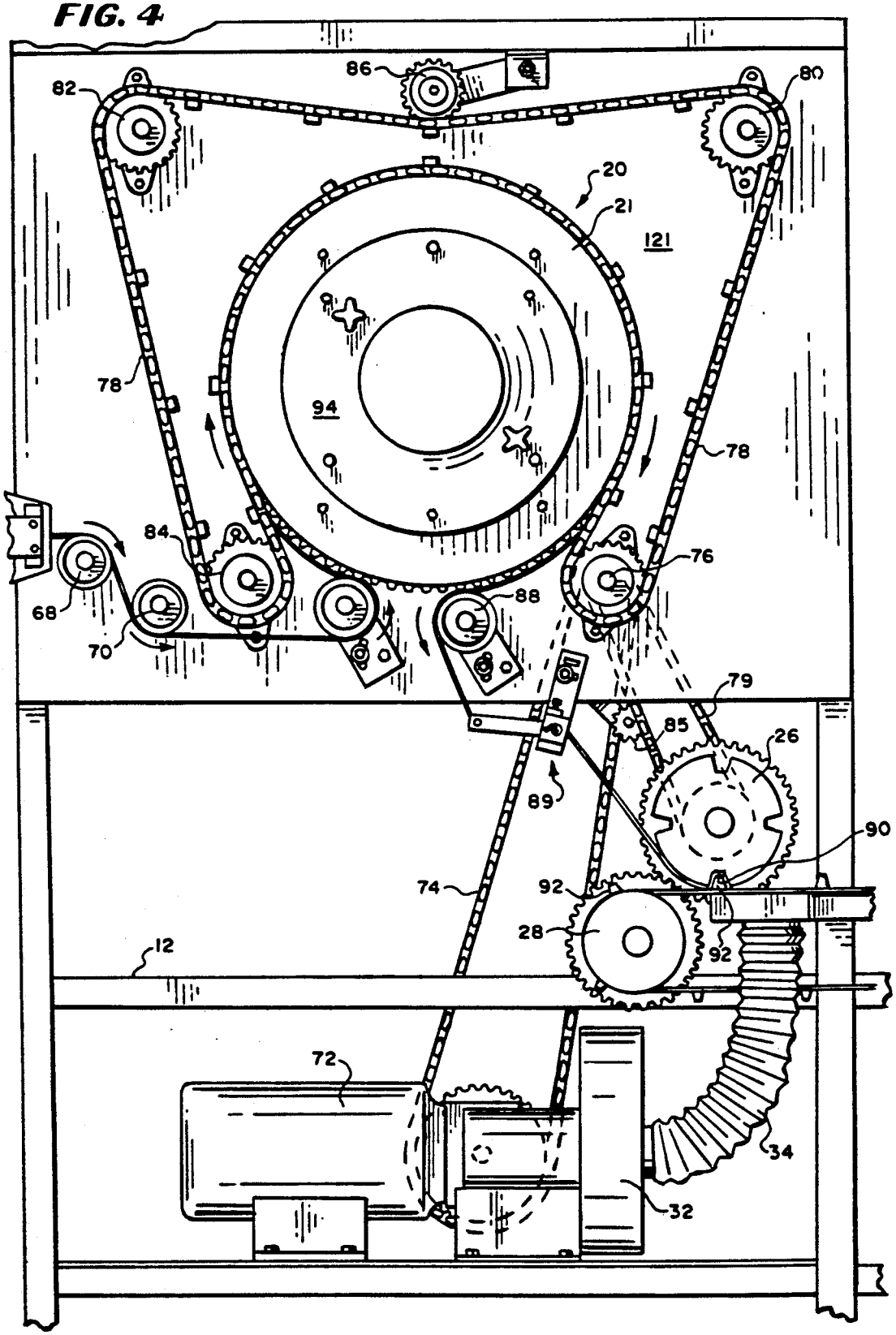
FIG. 4 is an enlarged front view of a drum assembly and its various associated power train components.

The drum assembly 20 including a drum 21, and its associated drive systems, are shown in FIG. 4. A motor 72 drives a chain 74 in a counterclockwise rotation over the shaft upon which sprocket 76 is mounted. A motor is driving the sprocket upon the shaft upon which sprocket 76 is mounted to impart clockwise drum rotation by means of dual chain 78 and similar rotation of the tucker roll 26. The tucker roll is driven by chain 79 which is tensioned by a gear idler sprocket 85. A series of gear sprockets at 80, 82 and 84 provide the geometry for the main chain 78 which is tensioned by a spring-loaded sprocket 86. Upon exit from the drum 21, around roller 88, the film is drawn past a tensioning device 89 into tucker roll notches 90 which are indexed to and converge with ribs 30 on the belt 38 in accordance with yet other features of our invention. The drum 21 is normally covered by an inspection plate 94 which can be removed for access to the interior mechanisms.

Figure 5:
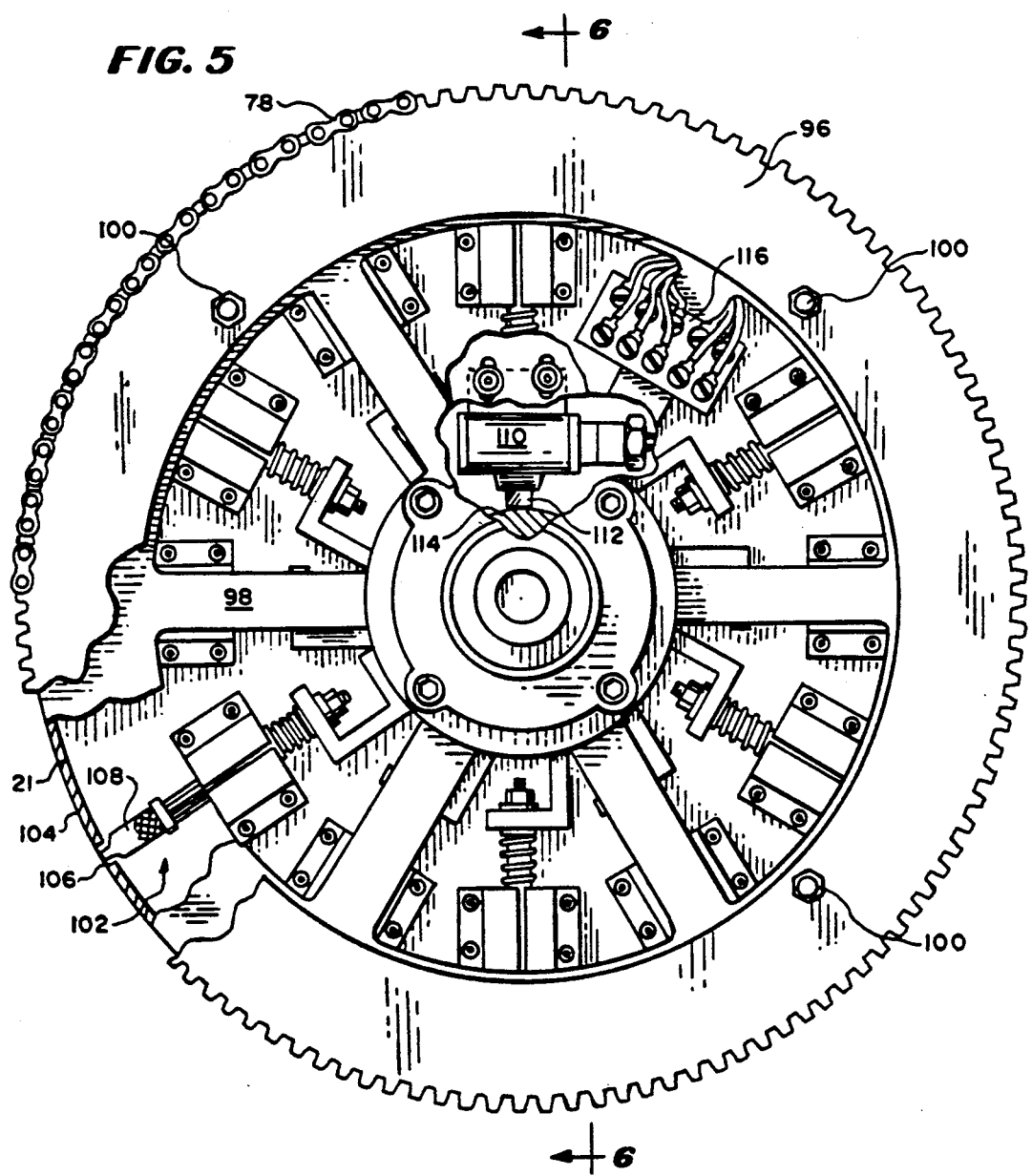
FIG. 5 is an enlarged side view illustrating internal members of the drum assembly when portions of a ring sprocket, a face plate and a mounting plate are partially broken away.

In FIG. 5, the drum 21 is shown without the cover and with parts of the ring sprocket and backing plate broken away. Sprocket 96, with only a portion of chain 78 shown, has a portion of its face broken away to illustrate the backing plate 98, both members being joined by bolts 100. In turn, the backing plate 98 is partly broken away to display a heating element assembly 102. The drum wall 104 is slotted at peripheral intervals, as at 106, coinciding with the positions of heating elements like 108. A further broken away portion illustrates a commutator assembly 110 which has carbon brushes 112 cooperating with energized brass rings 114 to supply electrical power to the junction block 116. Conductors from this block 116 lead to the individual heating elements 108 involving other features of our invention.

Figure 6:
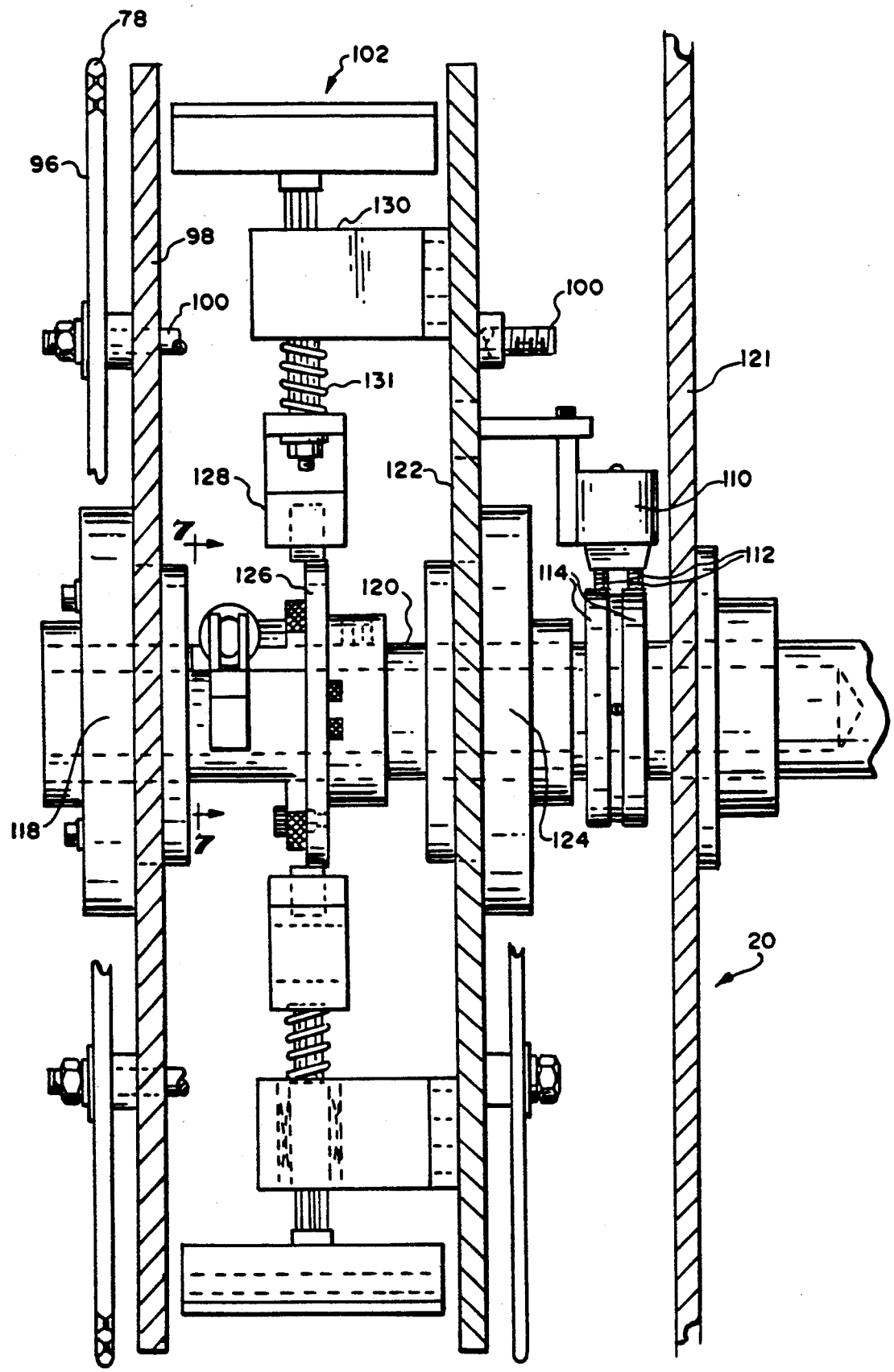
FIG. 6 is an enlarged fragmentary cross-sectional view taken essentially along line 6—6 of FIG. 5 showing the positioning of various operations parts in several vertical planes and with certain components shown in elevation.

FIG. 6 is a vertical section through the drum 21 and the drum assembly 20 as viewed on the line 6—6 of FIG. 5 as shown. It shows the sprocket 96 bolted to the backing plate 98 by the bolts 100. The sprocket 96 is rotated by the driving chain 78 on a ball bearing assembly 118 pressed onto the stationary main shaft 120 which passes through a back wall 121 of the drum assembly 20. A mounting plate 122 also rotates on the stationary shaft 120 by means of ball bearings at 124 and is connected to the sprocket 96 by the same bolts 100 which continue through the four rotating members which include the sprocket 96 and 121 and the plates 98 and 122. The commutator assembly 110 is attached to the rear face of the mounting plate 122 and is energized through rotating carbon brushes 112 in contact with fixed brass rings 114 secured to stationary main shaft 120. A fixed cam assembly 126 is keyed to the stationary main shaft 120 and cam followers 128 are spring-loaded against splined bearing blocks 130 which are attached to the mounting plate 122. As the mounting plate 122 rotates, the fixed cam assembly 126 causes the cam followers 128 to move radially, pushing the heating element assemblies 102 radially outwardly into a film heating relationship with the slotted peripheral wall 106 of the drum 21 (FIG. 7) involving features of our invention. When the cam follower 128 comes off a high portion of the cam profile to effect the heater element retraction mode, the spring 131 urges the cam follower 128 toward its return position on the lower portion of the cam face profile.

Figure 7:
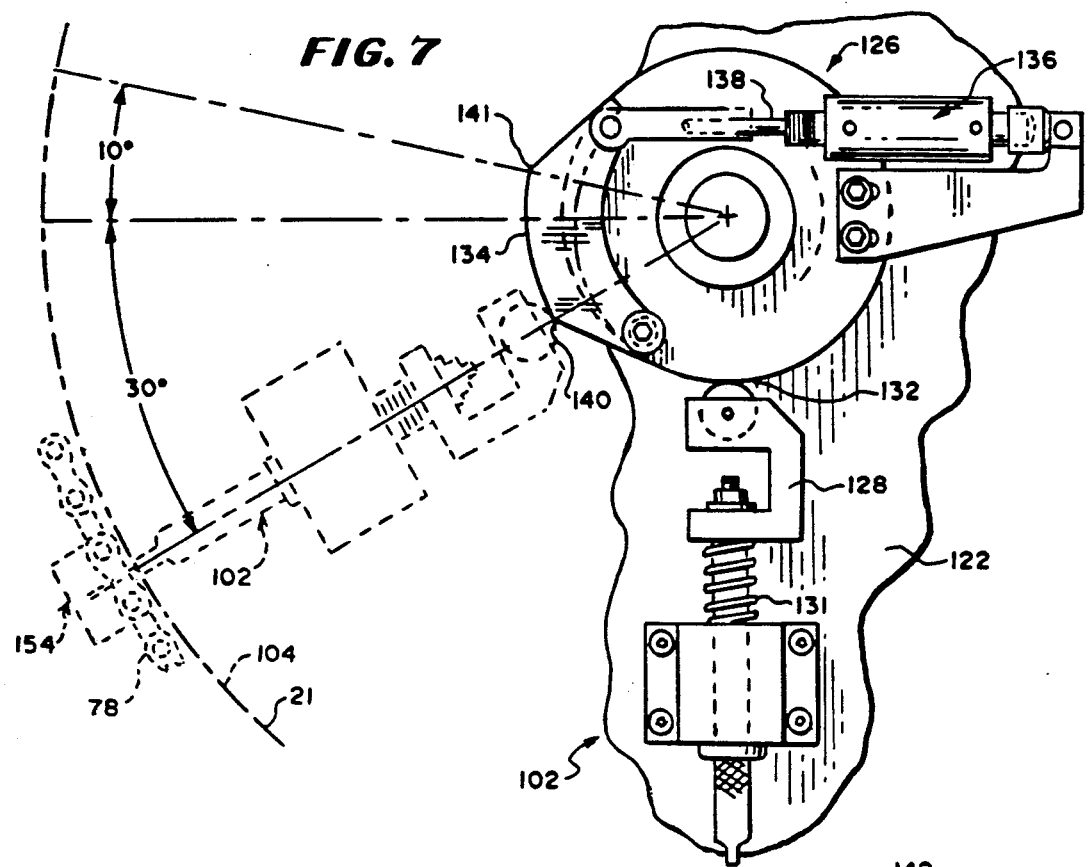
FIG. 7 is an enlarged fragmentary as viewed on line 7—7 of FIG. 6 illustrating a heating element actuating cam profile and related cam components.

In FIG. 7, the heating element assembly 102 is shown with the cam follower 128 in contact with the cam face 132. The cam assembly 126 has a secondary cam face 134 pivotally mounted and held to the desired profile by a piston assembly 136 actuating a link 138. As the mounting plate 122 rotates, the cam follower moves the heating element assembly 102 radially outward as it climbs to a highest point 140 on the cam profile. There is a dwell angle of 30 degrees to horizontal and another 10 degrees to the end of the heating period (FIG. 7), at which point 141 the heating element assembly is retracted. If the apparatus is shut down during the heat sealing interval, the piston link 138 pulls the secondary cam inward. This prevents overheating the film by moving the heating element away from the drum periphery, thus preserving the integrity of the film and its heat seal area.

Figure 8:
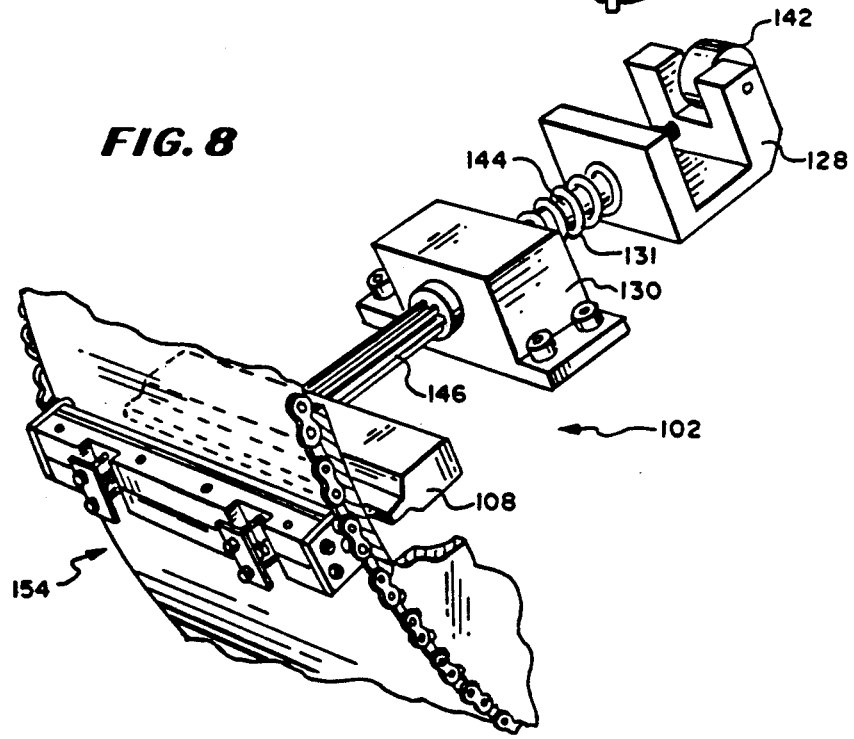
FIG. 8 is a fragmentary perspective view of a typical heating element plunger assembly in cooperation with a peripheral drum wall, a driving chain, and a perforating knife block.

FIG. 8 shows the heating element assembly 102 in perspective, as related to the drum periphery, film, and corresponding knife block 154. The cam follower 128 with a cam wheel 142 has a connected shaft 144 which reciprocates through the stationary bearing block 130. The bearing blocks 130 are screw fastened to the mounting plate and contain splined passages through which a splined portion 146 of the shaft 144 can travel. This splined relationship prevents the shaft 144 from rotating, thus keeping the heating element 108 from rotating out of alignment with the slot 106 in the drum's peripheral wall 104.

Figure 9:
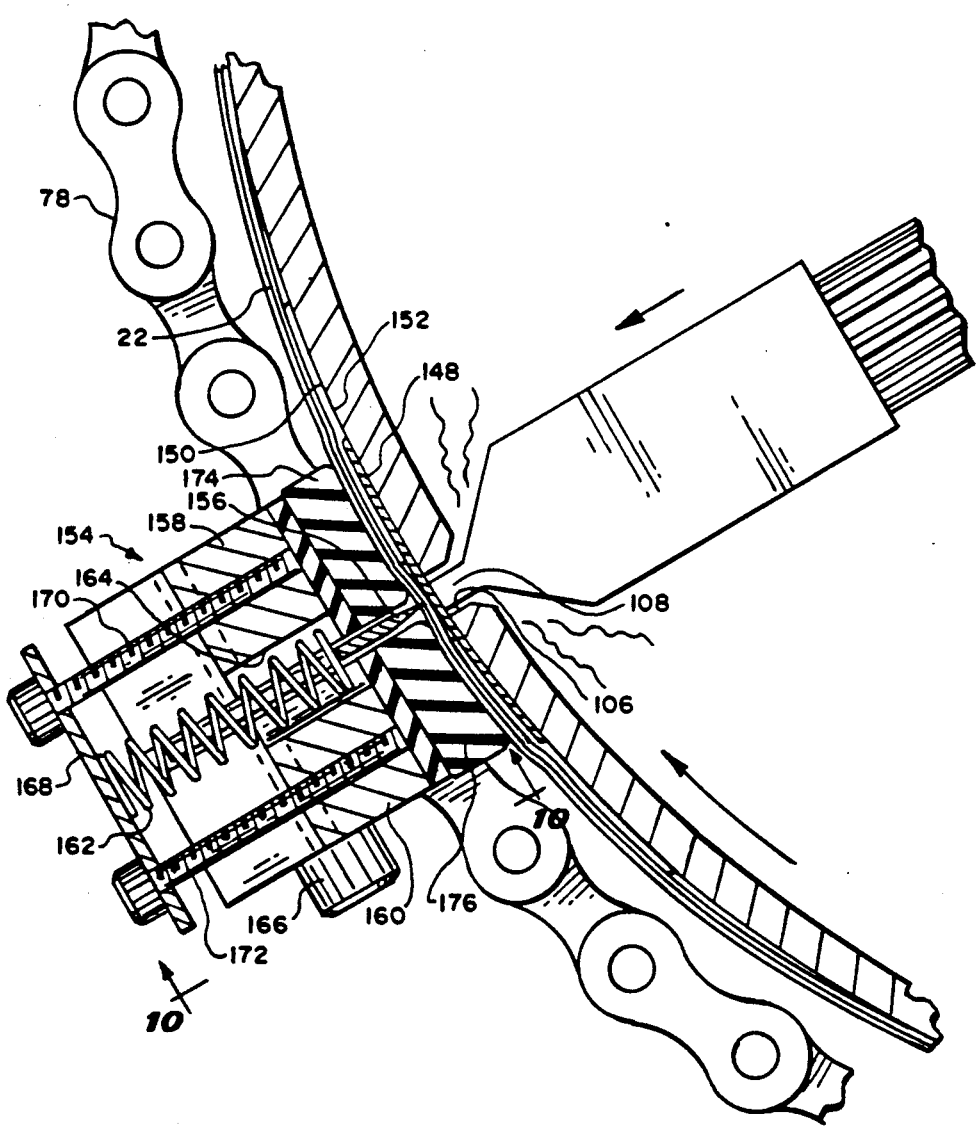
FIG. 9 schematically illustrates an enlarged section of a timed contact of a heating element with a slotted opening in the drum wall which aligns with a concurrent positioning of a typical block bearing a perforating knife.

In FIG. 9, the heat sealing and film perforating processes are clearly shown in section and partial profile involving important features of our invention. The heating element 108 moves radially into the drum slot 106 upon reaction to the cam profile which is timed to the drum chain travel. While in the illustrated form we prefer to use a cam profile for activating the heating element 108, other devices could be employed without departing from the broad concepts of our invention.

Figure 14:
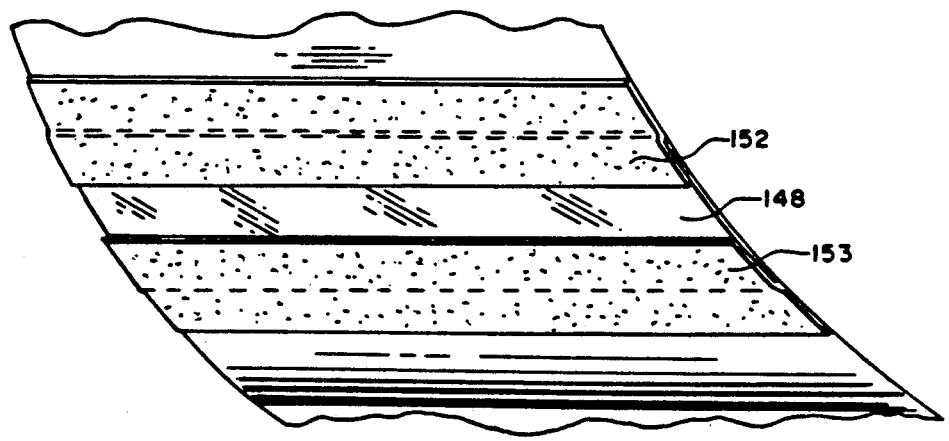
FIG. 14 is an enlarged fragmentary perspective view illustrating how a drum wall looks at the point where slotted, and with a piece of stainless steel being taped across the slot.

There are stainless steel shims or drum slot covers or film shields 148 which preferably are "Teflon" (a trademark of DuPont) coated which extend across the exteriors of the drum slots 106 and these are held to drum periphery or surface 150 by heat resistant tape bands 152 and 153 (See FIG. 14). This prevents direct contact between the heating element 108 and the plastic film 22 which is an important feature in the formation of side seals on the pouches being formed. The coating is preferably a high temperature, heat resistant, non-sticking type of synthetic plastic. While the shims or shields 148 are illustrated as being formed from stainless steel as a preferred material, it will be appreciated that other equivalent materials could be used such as copper, brass or aluminum. Stainless is preferred because of its durability. Excellent results can be attained with the shield having a stainless steel thickness of 0.002" and with a "Teflon" coating of 0.0005".

The dual drum chain 78 carries a plurality of precisely spaced backup sealing heads here illustrated as knife block assemblies 154 which are attached at each end of the chain links with each having a knife blade 156. The knife can be eliminated should it be desired to use a cut-off knife assembly to sever the fill packages from the film strip as an alternative packaging procedure. Such cut-off knife assemblies are well known in the art. The moving drum chain brings knife blocks 158 and 160 into simultaneous cooperative relationship with the heating elements as they are cam-actuated. The knife blade 156 is contained between the two block halves, 158 and 160, of the block assembly 154 and is spring loaded. Springs 162 are housed in half-bores 164 in the parallel block halves 158 and 160 joined by screws 166. The springs 162 are constrained by metal plates 168 secured to the block halves by bolts 170 and 172. On the inner block face, rubber pads 174 and 176 are fastened.

As the knife block assembly 154 moves into position, the rubber pads 174 and 176 grip and compress the film against the heated shim or cover or slot shield 148 and the rubber tends to fill in adjacent to the knife blade 156 to provide backing for a heat seal on either side of the knife. The knife penetrates the film with its serrated edge 178, providing perforations in the center of the heat seal.

Figure 10:
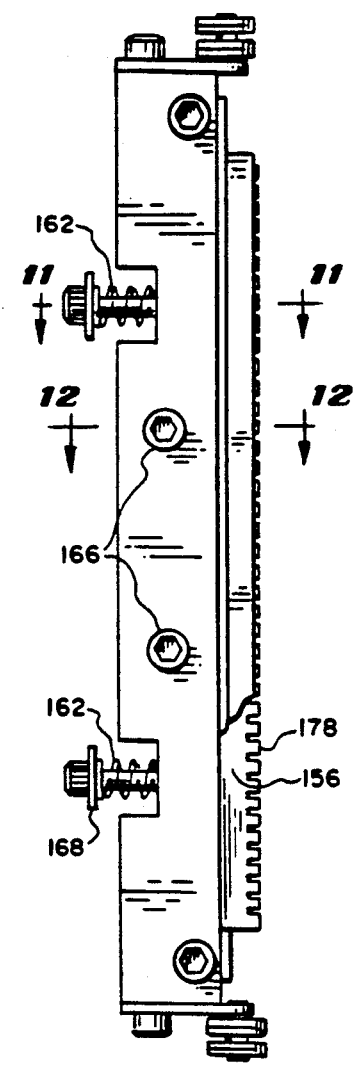
FIG. 10 is a view taken on line 10—10 of FIG. 9 portraying a side elevation of a typical knife block and is partially broken away to show the knife edge more fully.

In FIG. 10, a knife block, partially broken away, shows the serrated edge 178 of the blade 156. The springs 162 and transverse retaining plates 168 are again shown. The screws 166 are also depicted.

Figure 11:
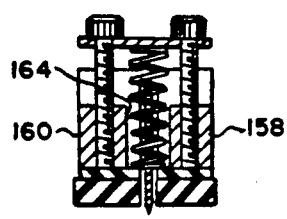
FIG. 11 is a sectional view as seen along line 11—11 of FIG. 10 showing spring-loaded perforating knives in their respective carrier blocks.
Figure 12:
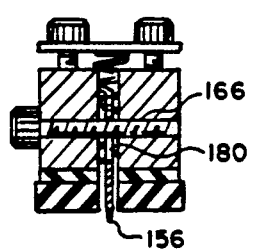
FIG. 12 is a sectional view as seen along the line 12—12 of FIG. 10 showing how two knife carrier block halves are joined.

The two block halves 158 and 160 are shown in section in FIG. 11. The spring bore 164 is also clearly portrayed. FIG. 12 illustrates the joining of the block halves by screws 166 which pass through slots 180 in the knife blade 156.

Figure 13:
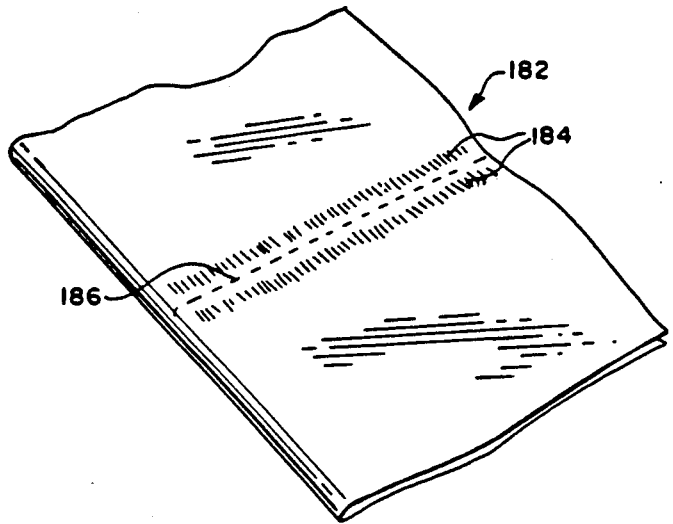
FIG. 13 is a fragmentary perspective view illustrating unfilled film pouches after being heat sealed and perforated to form pouches.

A portion of the sealed and perforated unfilled film envelope or pouch 182 is shown in FIG. 13. The heat seal 184 straddles the perforation 186 across the folded width of the film, so as to compartmentalize the open ended envelopes or pouches on either side of the sealed and perforated areas 184, 186.

FIG. 14 is an amplified perspective of the drum wall or the exterior peripheral surface 150 (peripheral exterior) illustrating the "Teflon" coated stainless steel shim or shield 148 held to its surface by tape bands 152 and 153.

Figure 15:
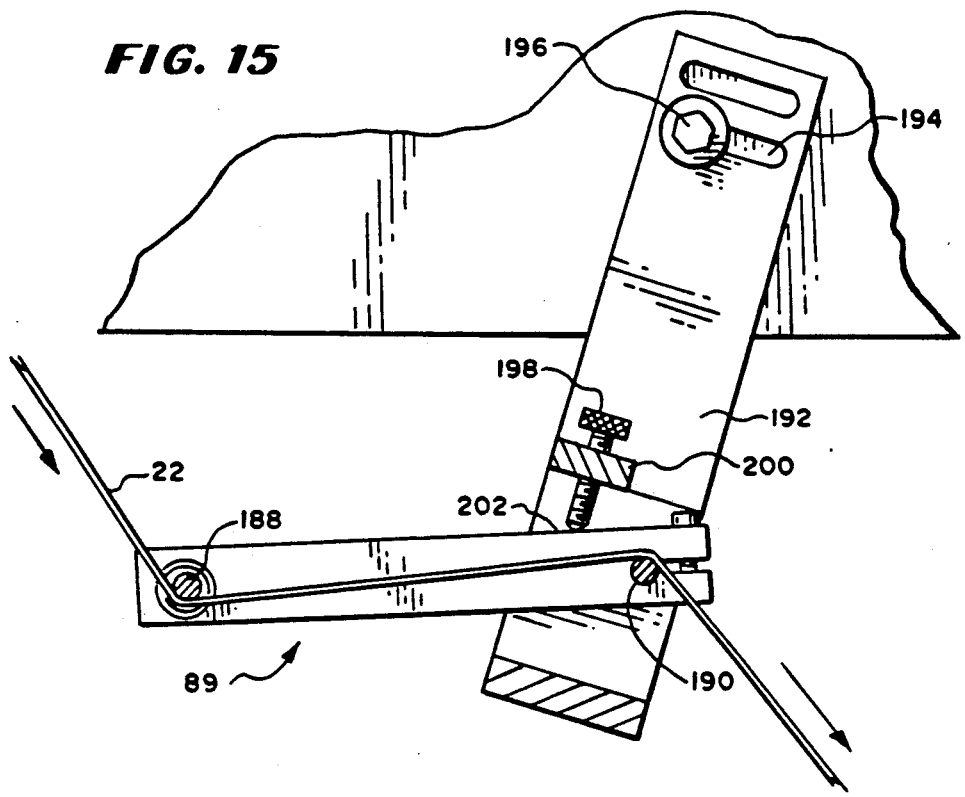
FIG. 15 is a sectional view through a film tensioning device which is located between the drum assembly exit rollers and a pouch conveyor system.
Figure 16:
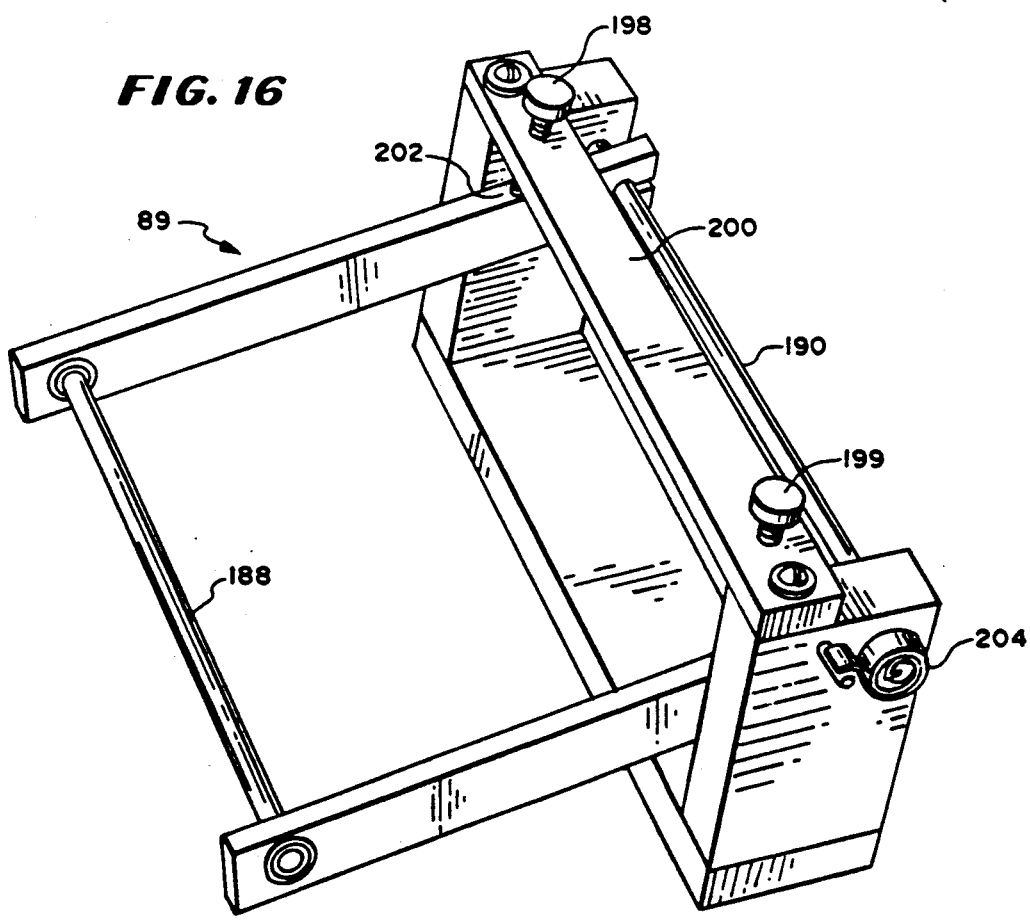
FIG. 16 is a perspective view of the tensioning device illustrated in FIG. 15.

The film tensioning device 89 is shown in FIGS. 15 and 16. The film 22 passes from the drum 21 downward under a bar 188 and across a span to another bar 190. It then passes onward to the tucker roll 26. The angle of the tensioner is adjusted with the arm 192 by means of slot 194 and bolt 196. Fine tuning of this angle is accomplished by the screws 198 and 199 which thread through plate 200 to bear against frame 202. As the film 22 develops slack, the frame 202 which is spring loaded by coil 204 swings against the film 22, thus taking out the slack.

Figure 17:
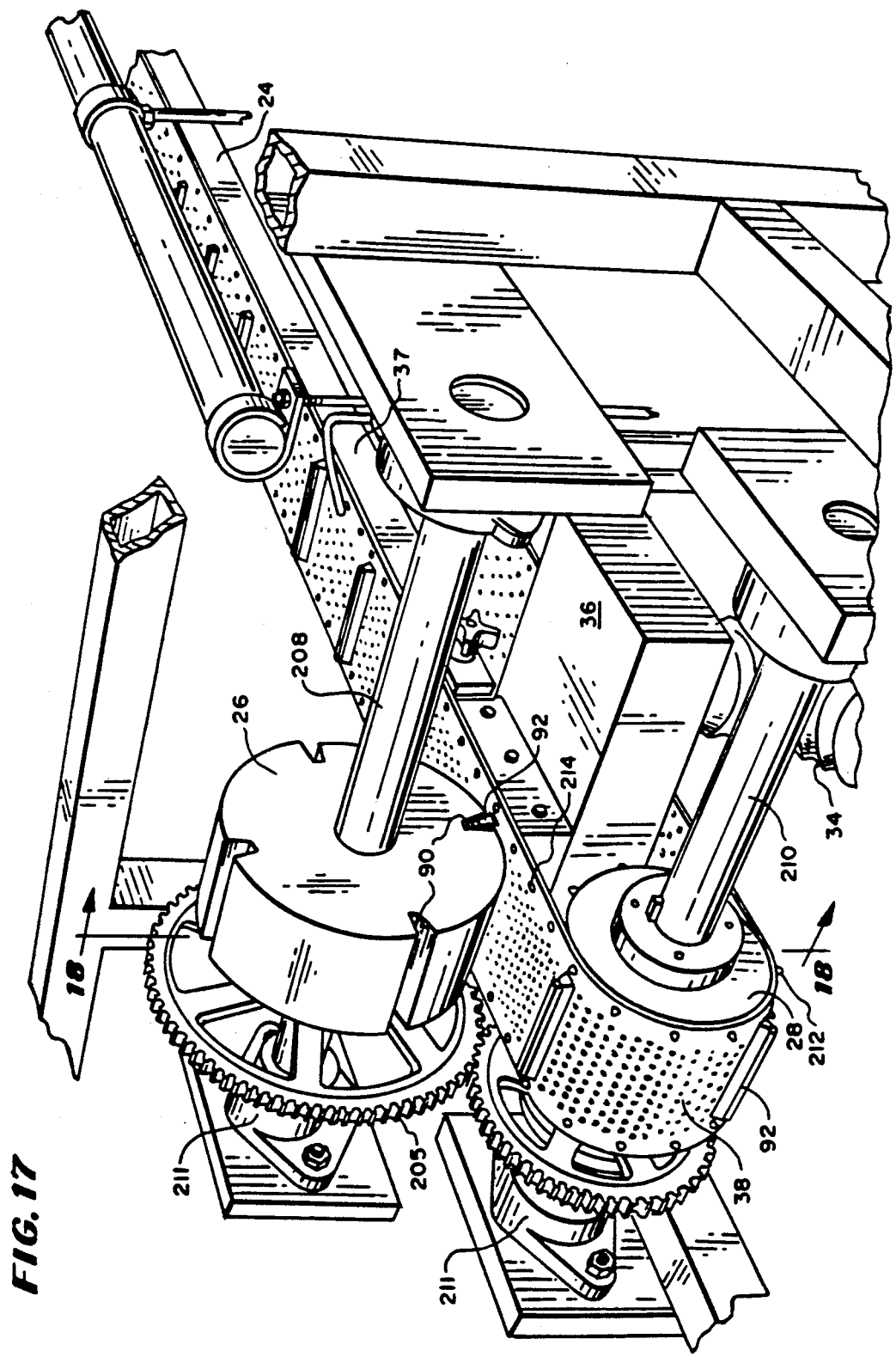
FIG. 17 is a perspective view showing the chain driven indexing drum and gear driven conveyor drum in association with pertinent air and vacuum delivery components, in addition to the conveyor itself.
Figure 18:
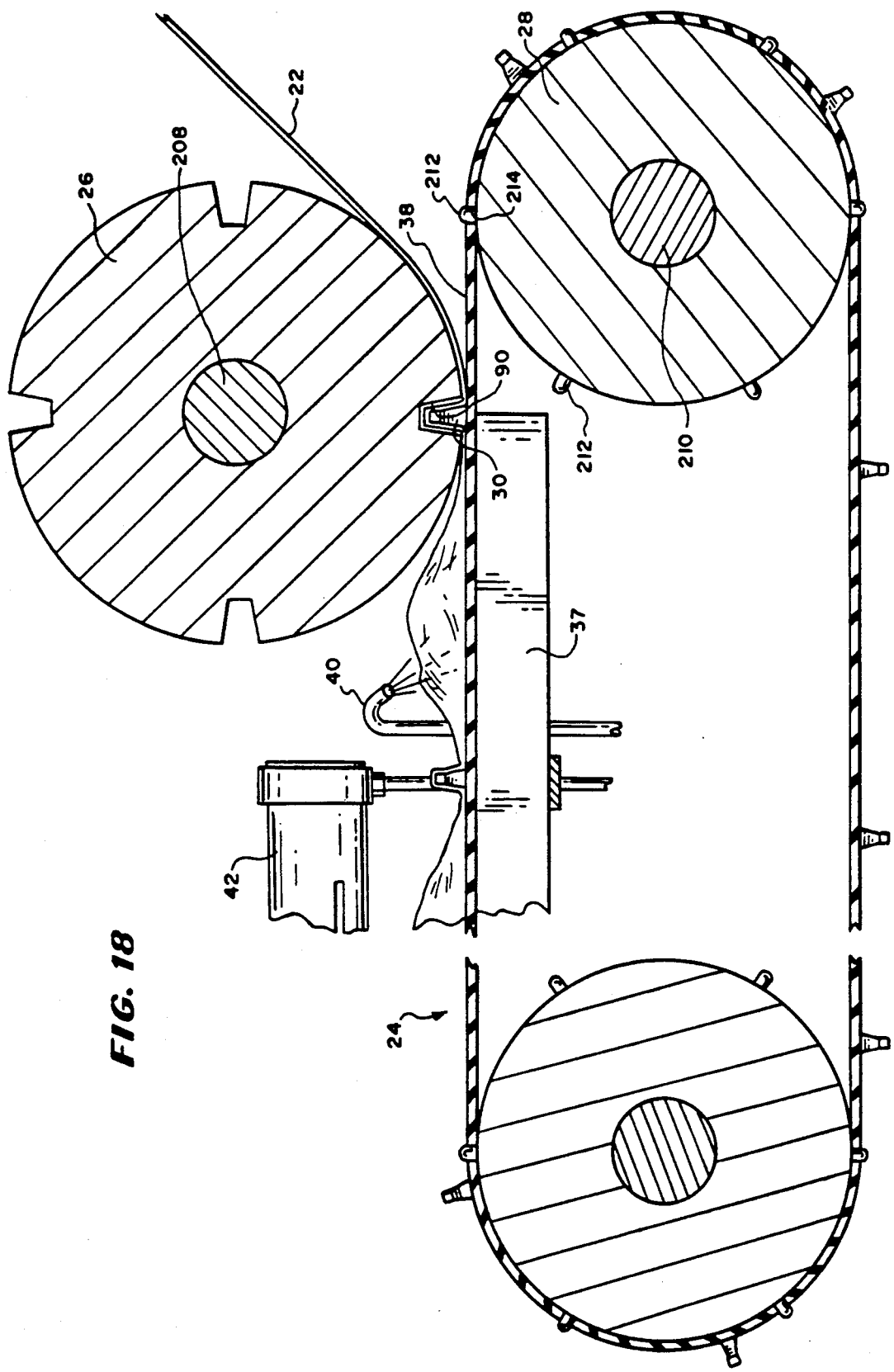
FIG. 18 is a sectional view of the conveyor apparatus from its back side to show the initial travel of the unfilled film pouch at which point the pouch is opened by a jet of air between its two layers prepartory for filling.
Figure 21:
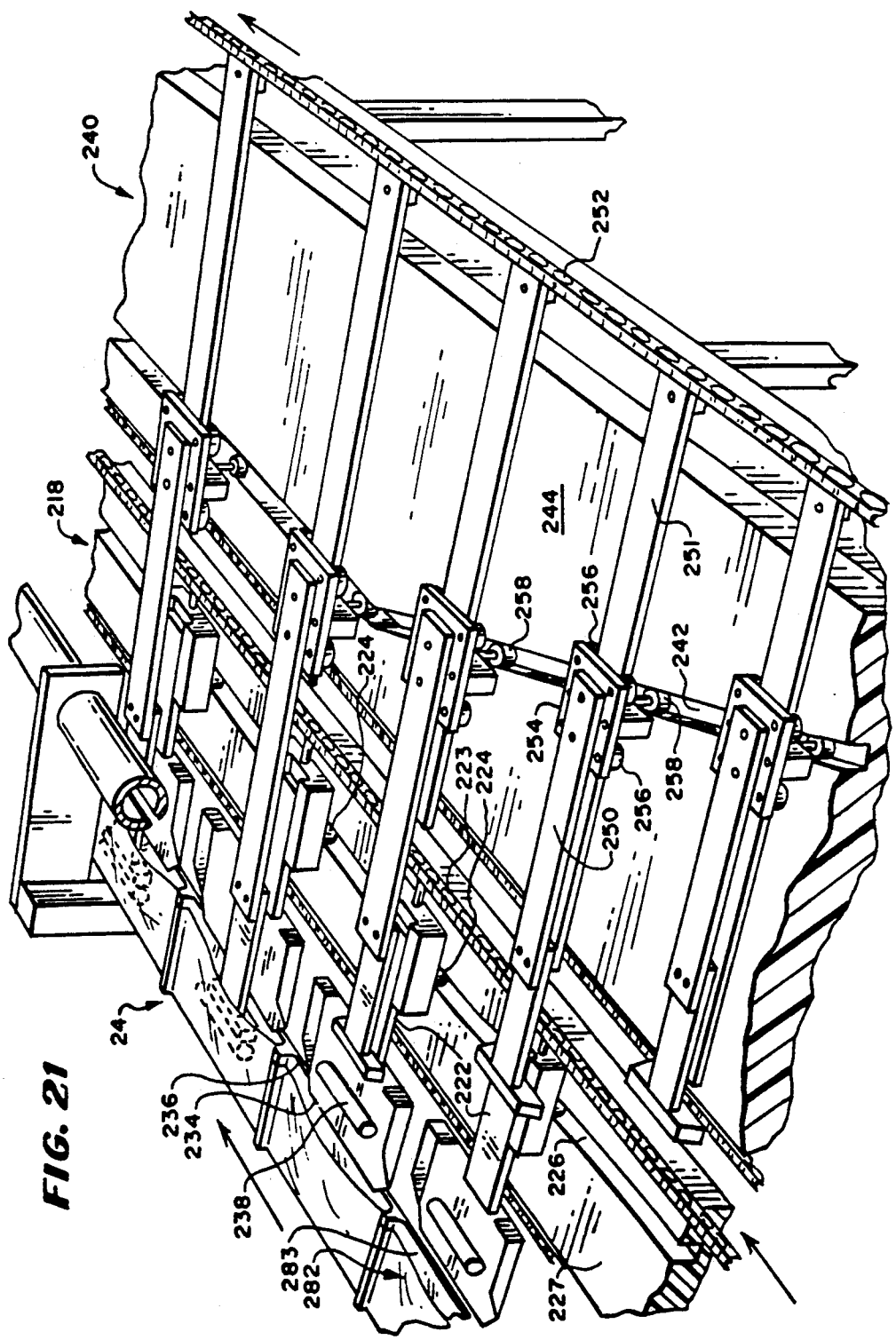
FIG. 21 is an enlarged fragmentary view illustrating a filling apparatus for inserting articles into the formed pouches.

FIG. 17 shows the tucker roll 26, as driven by chain 79 with its driven gear 205 in mesh with the gear of the indexing conveyor drive roller 28. The ribs 92 on the conveyor belt surface 38 are aligned with the notches 90 in the tucker roll 26. The conveyor belt travels in a loop on a conveyor bed 24 which is actually a closed vacuum chamber 37 subjected to internal vacuum. A vacuum hose 34 is connected from a pump to this chamber 36 through the plenum 36. The chamber 37 extends along the length of the conveyor belt while the plenum is positioned to one side of the chamber immediately adjacent heavy shaft 208 (FIG. 17). The tucker and indexing rollers are respectively rotated on heavy shafts 208 and 210, mounted appropriately in bearings as indicated at 211, 211. The conveyor belt is driven by pegs 212 on the indexing roller 28 which protrude to intercept spaced holes 214 along the conveyor belt edges 38. As the doubled or folded film 22 leaves the tucker roll 26 (FIG. 18), the air jet 40 parts the film into a pouch configuration with its bottom side held to the conveyor surface by vacuum and its upper pouch side flexed upward by the air flow.

FIG. 19 shows how a constant air flow 41 from the air manifold 42 keeps the pouches open. This is shown sectionally by FIG. 20 which clearly illustrates how vacuum pulls through perforations 215 within chamber 37 to restrain the lower pouch panel or side wall 216 while the air flow through the slit 43 in the air manifold 42 lifts the upper pouch panel or side wall.

The film envelope or pouch 22 has been represented in the drawings up to this point as being formed by or provided with two film panels of equal width folded together as shown initially in FIG. 2. This kind of fold would provide for an ultimate pouch having sides of equal dimension which could be filled in a variety of ways and allow the enclosure of a wide range of items. However, some products may require an envelope or pouch configuration 282 with a narrow flap 283 that could be sealed by adhesive after the pouch is folded over upon itself. FIGS. 21 through 26 are directed toward the filling of a pouch 282 of this modified type.

A means for filling the open pouches of the types previously described is provided by two parallel conveyor-like systems aligned beside existing conveyor belt 38 on its opened-pouch side. Conveyor 218, which is closest to existing conveyor belt 38, consists of a plurality of trays 220 mounted on laterally moving arms 222 (FIG. 21), carried by the chain 223. The tray mounting arms are provided with track-following means 224 which ride in a groove or track 226 formed in a top deck 227 of the conveyor frame, just below the tray mounting arms 222. From its initial position 228, the track 226 is formed so that it deviates slightly toward the pouch conveyor line as in the changed course designated at 230 (FIG. 22). It then parallels the existing pouch line to a terminal point 232 where it returns laterally to the same plane as its beginning point. As the tray arms 222 move longitudinally along the track course, they are carried from a position outside the pouches to new positions with the tray edges 234 just barely inside the pouch lip 236. The product 238, which is to be enclosed in the pouch, is carried upon the tray 220 to the filling position.

The second conveyor-like system 240 is constructed in a manner similar to conveyor 218 except that the track 242, formed in its top deck 244, takes a more radical, sharply angled deviation from the initial and final planes of movement shown by starting point 246 and final point 248 (FIG. 22). As shown by the perspective view of FIG. 21, there is a plurality of pusher arms 250 carried on guide bars 251 attached to the conveyor chain 252. The pusher arms 250 are mounted on blocks 254 which are guided by rollers 256 on either side of the guide bars 251. The pusher arm blocks 254, like the arms mounting the product trays 220, are provided with track followers 258 that ride in the track to effect lateral movement. As the pusher arm blocks follow the angled track 242, they roll laterally toward the product trays 220 and ultimately extend over them, pushing the product 238 into the open pouches 282.

In FIG. 23, the terminal end of the pouch conveyor line is shown with a fold over wheel 262 appropriately mounted on stand 264. This wheel initiates the action of rolling the pouch by lifting its folded edge from the conveyor surface 38 while a guide wheel 266, mounted a bit further on at stand 268, keeps the open side of the pouches compressed and aligned against the belt. This latter action is required since the perforations in the conveyor belt are now exposed and there is no longer sufficient vacuum to restrain or hold the pouches against the belt. As the lip 236 of the pouch leaves (FIG. 22) the guide wheel, the flap area 283 is sprayed with adhesive 272 from a delivery tube 274 (FIG. 23). A fence 276 concludes the pouch rollover process as its angled edge 278 bears upon the rolling pouch. The final sealing is accomplished by a resilient compression roller 280 that presses lapped surfaces of the closed pouch together as each closed pouch passes beneath the rollers.

In the practice of our different methods, it will be appreciated that excellent results can be obtained where the low density polyethylene film is heated to a temperature of in the range of 250° F. Depending upon the type of material and different conditions, this temperature may vary but the intent and purpose that we are attempting to achieve is to cause the layered film to change its state to a high temperature liquified state so that the layers can be sealed together. During this operation, it has been found that the sealing step can be effectuated by causing the film to move over a drum having "Teflon" or heat resistant, non-sticky type synthetic plastic coated plastic shields. These shields are periodically heated to a temperature sufficient to heat the polyethylene to a state to cause it to be liquified for sealing the layers of polyethylene together. During the sealing step, and in accordance with certain features of our invention, it is desirable also to form perforations in the area being sealed so that after the pouches have been formed and filled, the pouches can be readily separated from one another. If desired, the perforation step can be eliminated to permit the pouches to be separated in a different manner by the use of a knife in a cutoff operation. In any event, during the sealing step, it is also desirable to utilize a sealing head or blocks 158 and 160 which in the illustrated embodiment constitutes the knife block assemblies in one form of my invention. These assemblies provide a backup so that the layered film can be engaged in opposite sides as the film moves with the drum on the shields to insure a good sealing action while the shields are being heated. After the layered film has been caused to become liquified, it is thereafter desired to cool the film and then to remove the serrated knives and the backup sealing head from contact.

The pouch filling and sealing method or process is further illustrated somewhat schematically by FIGS. 24A through 24F. The pouch 282, held open by air stream 41 from air manifold 42, is shown secured to the conveyor 38 by the vacuum within the chamber 36. In the three steps portrayed by FIGS. 24A through 24C, the tray 220, which contains product 238, is moved just over the lip of the pouch. Then the pusher arm 250 is carried laterally by the track follower 258, enabling it to push the product from the tray into the opened pouch. All three conveyor lines are moving at the same speed so as to prevent interference in the filling actions. FIG. 24D shows the functions of the foldover and guide wheels 262, 266 as they respectively serve to turn and retain the pouch. The deposition of glue on the pouch lip is demonstrated in FIG. 24E which also illustrates how the fence 276 and its angled edge 278 accomplishes final pouch rollover. FIG. 24F shows the pouch being pressed into a closure or a closed filled pouch by the compression roller.

The pouches are finally separated from one another by a pair of pouch severing rollers 284 and 286. The pouch severing roller 286 is turning at a slightly higher speed than is roller 284. While a pouch 288 is clamped by slower-turning roller 284, the adjacent pouch 290 has been contacted by roller 286 and pulled away by separation along the perforated seam or the transverse line of perforations due to the more rapid rotation of the latter roller as it compresses the pouch. A finished filled pouch or closure is illustrated in FIG. 26 at 292. With certain types of bag forming techniques involving the use of low density polyethylene type films it may be desired to eliminate the perforating knife and separate the pouches after the pouches have been filled and sealed, and such techniques ca be practical without deviating from certain of the broad inventive concepts disclosed and claimed herein. The use of our perforating knife mechanism in the formation of seals in low density polyethylene embodies certain method and apparatus features of our invention for use in certain preferred applications other than the preferred embodiment herein disclosed.

As various possible embodiments may be made in the above invention for use for different purposes and as various changes might be made in the embodiments and method above set forth, it is understood that all of the above matters here set forth or shown in the accompanying drawings are to be interpreted as illustrative and not in a limiting sense.

We claim:

1. A rotary drum sealing apparatus for sealing low density polyethylene film for packaging articles comprising a hollow rotary drum for sealing film at its outer perimeter, film heating mechanisms reciprocally mounted interiorly of said drum, circumferentially spaced drum slots extended through the perimeter of said drum for receiving outer ends of said film heating mechanisms, "Teflon" coated stainless steel slot shields closing said drum slots for shielding the film from the outer ends of said film heating mechanism to prevent direct contact of the film with said heating mechanisms and with said film heating mechanisms in periodic contact with the shields for heating the shields and sealing the film, means securing said slot shields to said drum enabling the film to be maintained at all times free of contact from said film heating mechanisms, and timed means for retracting said film heating mechanisms after package seals have been sequentially formed in the film.

2. The apparatus of claim 1 wherein an endless rotary chain is mounted tangentially of said drum for periodic cooperative co-action therewith during formation of heat seals in the film, the chain having knife block assemblies carried along the length thereof each with a knife, the knife block assemblies being positioned for periodic operative engagement with outer surfaces of said slot shields over said drum slots, and spring means urging said knives against the film while film seals ar being formed by said film heating mechanisms.

3. The apparatus of claim 2 wherein each of said knife block assemblies having pads comprised of an elastomeric material for holding the film against said shields while heat seals are being formed in the film.

4. The apparatus of claim 1 wherein said drum is mounted on a driven shaft, cam means on said drive shaft for actuating said film heating mechanisms for heating said slot shields to a temperature of about 250° F. to heat the film for joining lapped are of the film to form heat seals after the film heating mechanisms have been retracted and the film temperature has dropped to 200° F. or less.

5. The apparatus of claim 4 wherein said film heating mechanisms are each provided with a heating element, and retractor means for moving said heating element away from the film only if the apparatus is shut down during a heat sealing interval.

6. A rotary drum sealing apparatus for sealing low density polyethylene film for packaging articles comprising a hollow rotary drum for sealing film at its outer diameter, radially extending film heating mechanisms extending radially of a central axis of said drum and mounted inside said hollow drum, circumferentially spaced drum slots extending through an outer perimeter of said drum for receiving outer ends of said film heating mechanisms, high temperature, heat resistant, non-sticky type synthetic plastic coated slot shields closing said drum slots for shielding the film from the outer ends of said film heating mechanism to prevent direct contact of the film with said heating mechanisms, means securing said slot shields to said drum timed means for extending said film heating mechanisms into operative engagement with said shields for heating the shields, and means for retracting said heating mechanisms after the package seals have been sequentially formed in readiness for another cycle of operation.

7. The apparatus of claim 6 wherein an endless rotary chain is mounted tangentially of said drum for cooperative co-action therewith, the chain having knife block assemblies along the length of the chain each with a serrated knife, the knife block assemblies being positioned for periodic operative engagement with an outer surface of said film shield over said drum slots, and means timed for actuating and retracting said serrated knives against the film while perforated film seals are being formed by said film heating mechanisms.

8. The apparatus of claim 7 wherein said chain is comprised of a series of links, means securing each of said knife block assemblies to opposite ends of pairs of said links in supported assembly therewith.

9. The apparatus of claim 7 wherein each of said knife block assemblies has a pair of pads, the pads being on opposite sides of each knife for engagement against the film extended across said shield to assist in forming heat seals on the film.

10. The apparatus of claim 6 wherein said shields are each comprised of stainless steel having a thickness in the range of 0.005" and are coated with an outer layer of "Teflon" having a thickness in the range of 0.0005" for contact with the film.

11. A rotary drum sealing apparatus for sealing low density polyethylene film for packaging articles comprising a hollow rotary drum for sealing film at its outer diameter, radially extending film heating mechanisms positioned in said hollow drums radially outwardly of a central axis of said drum, circumferentially spaced drum slots through said drum for receiving outer ends of said film heating mechanisms, high temperature, heat resistant, non-sticky type synthetic plastic coated metallic slot shields closing said drum slots for shielding the film from the outer ends of said film heating mechanism to prevent direct contact of the film with said heating mechanisms, means securing said slot shields to said drum enabling the film to be maintained at all times free of contact from said film heating mechanisms, and means for moving said film heating mechanisms in said hollow drum into contact with said shields for heating the film, and timed means for retracting said film heating mechanisms after the package seals have been sequentially formed.

12. The apparatus of claim 11 wherein an endless rotary chain is mounted tangentially of said drum for cooperative co-action therewith, the chain having knife block assemblies along the length thereof each with a serrated knife, the knife block assemblies being positioned for periodic operative engagement with an outer surface of said film shield over said drum slots, and means timed for actuating said serrated knives against the film to assist in the formations of perforated film seals with by said film heating mechanisms.

13. The apparatus of claim 12 wherein said film heating mechanisms are each provided with a heating element, and retractor means for moving said heating element away from the film of the apparatus is shut down during a heat sealing interval.

14. A method of packaging continuously formed pouches from low density polyethylene layered film comprising the steps of training the layered film onto a drum over slots in its outer periphery, consecutively heating "Teflon" coated metallic shields over the slots while the low density polyethylene layered film is engaged with the shield causing the state of the layered film to change to a high temperature liquified state, moving a serrated knife into the liquified film while in the high temperature liquified state with the serrations being immersed in the liquified film, cooling the shields causing the liquified film to solidify and to become fused thereby forming serrated seals which seals are located at spaced intervals along the length of the layered film.

15. The method of packaging of claim 14 wherein the serrated knives are removed at points in time after the liquified film has solidified leaving lines of perforations extending transversely of the film at longitudinally spaced intervals.

16. A method of packaging continuously formed pouches from low density polyethylene layered film comprising the steps of training the layered film onto a drum over slots in its outer periphery, consecutively heating heat resistant, non-sticky type synthetic plastic coated metallic shields over the slots while the low density polyethylene layered film is engaged with the shield causing the state of the layered film to change to a high temperature liquified state, moving a sealing head against the liquified film while in the high temperature liquified state to assist in sealing the liquified layered film, cooling the shields causing the liquified film to solidify and to cause the film layers to become fused thereby forming seals which seals are located at spaced intervals along the length of the layered film.

17. The method of packaging of claim 16 wherein the polyethylene film is heated to a temperature in the range of 250° F. to generate the high temperature liquified state.

18. The method of claim 17 wherein the high temperature polyethylene liquified film is cooled from the range of 250° F. to a temperature in the range of 200° F. to cause the liquified film to solidify.

19. The method of claim 16 wherein the polyethylene film is of an unsupported type having a thickness in the range of 0.5 mil to 4 mil.

20. The method of claim 16 wherein the polyethylene film is of an unsupported type having a thickness of 1.5 mil.

* * * * *